US008509419B2

(12) United States Patent
Erhart et al.

(10) Patent No.: US 8,509,419 B2
(45) Date of Patent: Aug. 13, 2013

(54) COMPUTER AND TELEPHONY INTEGRATION

(75) Inventors: George William Erhart, Pataskala, OH (US); David Joseph Skiba, Golden, CO (US); Venkatesh Krishnaswamy, Holmdel, NJ (US); Ravi Sethi, Far Hills, NJ (US); Valentine C. Matula, Granville, OH (US)

(73) Assignee: Avaya, Inc., Basking Ridge, NJ (US)

( * ) Notice: Subject to any disclaimer, the term of this patent is extended or adjusted under 35 U.S.C. 154(b) by 1854 days.

(21) Appl. No.: 10/955,977

(22) Filed: Sep. 30, 2004

(65) Prior Publication Data
US 2006/0067507 A1 Mar. 30, 2006

(51) Int. Cl.
H04M 5/00 (2006.01)

(52) U.S. Cl.
USPC .................................. 379/265.12; 379/265.02

(58) Field of Classification Search
USPC ............................. 379/265, 266, 88.18, 88.17
See application file for complete search history.

(56) References Cited

U.S. PATENT DOCUMENTS

| 5,937,051 | A | 8/1999 | Hurd et al. |
| 6,327,359 | B1 | 12/2001 | Kang et al. |
| 6,459,774 | B1 | 10/2002 | Ball et al. |
| 6,678,718 | B1 * | 1/2004 | Khouri et al. ................. 709/204 |
| 6,707,811 | B2 | 3/2004 | Greenberg et al. |
| 6,871,212 | B2 * | 3/2005 | Khouri et al. ................. 709/204 |
| 6,976,094 | B1 * | 12/2005 | Dalrymple et al. ........... 709/248 |
| 7,366,285 | B2 * | 4/2008 | Parolkar et al. ............. 379/88.17 |
| 7,366,514 | B2 * | 4/2008 | Ejzak ............................. 455/436 |

| 2002/0055967 | A1 | 5/2002 | Coussement |
| 2003/0021264 | A1 | 1/2003 | Zhakov et al. |
| 2003/0058838 | A1 | 3/2003 | Wengrovitz |

FOREIGN PATENT DOCUMENTS

| GB | 2290193 A | 12/1995 |
| JP | 2002057801 | 2/2002 |
| JP | 2002-218063 A | 8/2002 |
| JP | 2003348229 | 12/2003 |
| KR | 10-2002-0044430 | 6/2002 |

OTHER PUBLICATIONS

K. Bekki, "Japanese Patent Application No. 2005-286363 Final Office Action", Oct. 17, 2008, Publisher: JPO, Published in: JP.
Fausto Molinari, "European Patent Application No. EP 015 25 6039 Search Report", Jan. 22, 2009, Publisher: EPO, Published in: The Hague.
Bekki, K., "JP Application No. 2005-286303 Office Action Nov. 16, 2009", , Publisher: JPO, Published in: JP.
Emery, Carole, "EP Application No. 05256039.8-1237 Examination Report Sep. 4, 2009", , Publisher: EPO, Published in: EP.

* cited by examiner

Primary Examiner — Amal Zenati

(57) ABSTRACT

A method is disclosed that coordinates the presentation of speech signals and screen images to a receiver of a call, without some of the costs, disadvantages, and limitations of techniques in the prior art. The illustrative embodiment of the present invention builds upon the infrastructure of the Session Initiation Protocol (or "SIP") to distribute and transfer calls to agents who are associated with a call center or contact center system. A server-based system is used in conjunction with call distribution based on SIP to replace some desktop and agent computer/telephony integration arrangements, thereby providing first-party call control. Customer-related information is embedded in the call transfer itself; as a result, the display of the customer-related information occurs at the agent's telecommunications terminal at the same time the call arrives.

16 Claims, 9 Drawing Sheets

COMPUTER AND TELEPHONY INTEGRATION

FIELD OF THE INVENTION

The present invention relates to telecommunications in general, and, more particularly, to a technique for presenting image and speech signals to a user of a telecommunications system in a coordinated manner.

BACKGROUND OF THE INVENTION

A call center is a place where calls from users, such as customers, are handled in support of an organization's activities. Organizations that provide a call center, such as companies that offer a service or a product, do so to provide assistance and information to customers of the service or product. A call center is staffed by people referred to as "agents," to whom incoming calls from users are transferred.

In a call center, when a call is transferred to an agent, the agent is more efficient if a computer data screen that corresponds to customer information can be displayed automatically. The display of the screen is sometimes known as a "screen pop." The displaying of the screen pop is orchestrated by what is known as "computer/telephony integration."

Several system architectures are currently available to drive screen pops. FIG. 1 depicts a first telecommunications system 100 for a call center in accordance with the prior art. Telecommunications system 100 comprises telecommunications terminal 102, telecommunications network 103, private branch exchange 104, interactive voice response system 105, call center system 106, telecommunications terminal 107, computer/telephony integration server 108, computer system 109, personal computer 110, and private branch exchange 112, interconnected as shown.

In the architecture depicted by FIG. 1, a customer, depicted as user 101, uses telecommunications terminal 102 (e.g., a telephone, etc.) to call into a call center that is supported by call center system 106. The call is handled by telecommunications network 103, which connects terminal 102 with private branch exchange (or "PBX") 104. Network 103 comprises one or more types of networks (e.g., Public Switched Telephone Network, etc.). Private branch exchange 104 supports call center system 106 and notifies call center system 106 of the call.

Call center system 106 directs private branch exchange 104 on how to handle the call. One possibility is that the call is passed first to interactive voice response (IVR) system 105, as directed by call center system 106. IVR system 105 provides interactive voice response capability, enabling user 101 to enter commands, either by talking or by selecting options using the keypad on terminal 102.

Call center system 106 selects the appropriate agent or call center to which to transfer the call, based in part on the input from user 101 if IVR system 105 is used. Call center system 106 provides its routing decision to private branch exchange 104. Based on the routing decision, private branch exchange 104 might transfer the call to telecommunications terminal 107, which is used by the agent depicted as user 111. Alternatively, private branch exchange 104 might transfer the call to private branch exchange 112, which supports a different call center than the one supported by call center system 106.

Computer system 109 maintains customer records that can be accessed and displayed by personal computer 110. The agent that receives the call, user 111, has previously logged into computer system 109 via personal computer 110, which enables the display of the screen pop. The agent has also logged into private branch exchange 104, which enables the receiving of the audio signal in the call. The agent logs into both devices, for example, when beginning a work shift.

The architecture of FIG. 1 relies on computer/telephony integration server 108 to coordinate the screen pop. Server 108 exchanges signals between private branch exchange 104 and computer system 109 to coordinate (i) the screen pop at personal computer 110 with (ii) the presentation of the call at telecommunications terminal 107. Essentially, private branch exchange 104 informs server 108 that a call is about to be transferred to a particular agent's terminal (i.e., telecommunications terminal 107). Server 108 then pushes the customer information to computer system 109 for the purpose of displaying the information on the same agent's personal computer (i.e., personal computer 110).

FIG. 2 depicts a second telecommunications system 200 for a call center in accordance with the prior art. Telecommunications system 200 comprises telecommunications terminal 102, telecommunications network 103, call center system 106, interactive voice response system 105, private branch exchange 204, telecommunications terminal 207, computer system 209, personal computer 210, and private branch exchange 112, interconnected as shown.

In the architecture depicted by FIG. 2, a customer, depicted as user 101, uses telecommunications terminal 102 (e.g., a telephone, etc.) to call into a call center. The call destination is determined and the call is transferred in essentially the same manner as depicted in FIG. 1.

In the architecture depicted in FIG. 2, private branch exchange 204 transfers the call, if directed to do so by call center system 106, to telecommunications terminal 207, which is the terminal of the agent depicted as user 211. Private branch exchange 204 uses a protocol that is understood by terminal 207, such as data control protocol (or "DCP"), to transmit the calling number and called number to terminal 207. Terminal 207 has a data communications link to personal computer 210. An example of terminal 207 is the AT&T PassageWay terminal, which is connectable to a computer through a serial communications link.

Computer system 209 maintains customer records that can be accessed and displayed by personal computer 210. The agent that receives the call, user 211, has previously logged into computer system 209 via personal computer 210, which enables the display of the screen pop. The agent has also logged into private branch exchange 204, which enables the receiving of the audio signal in the call. The agent logs into both devices, for example, when beginning a work shift.

The architecture of FIG. 2 relies on terminal 207 to coordinate the screen pop at personal computer 210 with the presentation of the call to user 211. In this architecture, terminal 207 pushes the calling number and called number information to personal computer 210 when the call is presented to user 211. User 211 then uses the information to access the customer record and display the screen pop.

There are several disadvantages that are associated with the architectures depicted in FIGS. 1 and 2. In the architecture of FIG. 1, the screen pop often occurs on the agent's personal computer 110 before the speech signal of the call reaches the agent's telephone terminal 107, which can be confusing to the agent.

In the architecture of FIG. 2, there is no direct path from the telephony system to the computer system. Because terminal 207 only conveys the calling number/called number pair, it is therefore left up to the agent to determine which computer system (i.e., system 209 or another system) to log into to pull up the customer information. Also, the direct transfer of the call between a first agent and a second agent causes the connection with the screen to be lost; consequently, no screen pop occurs for the second agent.

Both architectures have further disadvantages in common. First, the agent must log into a computer system, in some cases to establish an agent identity that can be matched with a specific telephone terminal. Casual receivers of calls (e.g., resident experts, etc.) who do not log into computer systems cannot receive screen pops. Second, an organization might use more than one call center system because the organization has multiple locations or lines of business, or hosts a call center as an application service provider for more than one client. In these situations, the agent must either log into multiple computer systems simultaneously or the resident expert must decide which system to log into from one call to another.

These disadvantages of third-party call control increase the likelihood that the receiver of the call will handle the call (i) without a timely screen pop or any screen pop at all, and (ii) without the ability to access customer information. Consequently, the caller might receive service that is substandard or that is inconsistent with what can be offered by having a proper screen pop.

What is needed is a technique to coordinate the presentation of speech signals and screen images, to a receiver of a call, without some of the costs, disadvantages, and limitations of techniques in the prior art.

SUMMARY OF THE INVENTION

The present invention is a technique that coordinates the presentation of speech signals and screen images to a receiver of a call, without some of the costs, disadvantages, and limitations of techniques in the prior art. The illustrative embodiment of the present invention builds upon the infrastructure of the Session Initiation Protocol (or "SIP") to distribute and transfer calls to agents who are associated with a call center or contact center system. A server-based system is used in conjunction with call distribution based on SIP to replace some desktop and agent computer/telephony integration arrangements, thereby providing first-party call control. Customer-related information is embedded in the call transfer itself; as a result, the display of the customer-related information occurs at the agent's telecommunications terminal at the same time the call arrives.

In accordance with the illustrative embodiment of the present invention, calls arrive at a contact data-processing system. The calls arrive via the Public Switched Telephone Network (or "PSTN"). Alternatively, the calls can arrive via session initiation protocol, via H.323 internet protocol, or time division multiplexed from another call center system.

Once the call arrives, the contact data-processing system takes all available information from the incoming call and uses it with any data gathered by an interactive voice response system to establish the customer identity. Working with a web server, the contact data-processing system generates customer-related data, either in the form of a call handle or "pointer" (e.g., a uniform resource location [URL] address, etc.), or a customer account record. The contact data-processing system selects an agent to receive the call and transfers the call to the agent. The call transfer itself passes the customer-related data to the agent endpoint via a data element or elements that are transported by session initiation protocol.

In accordance with the illustrative embodiment, the agent endpoint is an internet protocol softphone that is also session initiation protocol-enabled. When the endpoint receives the customer-related data, the endpoint can, either automatically or upon agent request, launch a browser or an application to retrieve and display the data from the web server.

The illustrative embodiment of the present invention is advantageous over some techniques in the art for several reasons. First, since the customer-related data, such as a temporary URL address to a web page of customer information, is embedded in the call transfer itself, the information necessary to achieve the screen pop arrives at the agent's endpoint at the same time the call arrives. Second, the endpoint can quickly retrieve the customer information screen by using the URL address to access the screen file in the web server, without requiring any involvement of the agent. Third, a URL address is portable and can be easily passed to a casual receiver (e.g., resident expert, etc.) or to another call center, thereby facilitating computer/telephony integration across site, company, and country boundaries. Fourth, the web server is accessible via an Internet Protocol network, and therefore the agent does not have to log into multiple systems or figure out which system to log into from one call to another. Instead, the contact data-processing system determines where the customer information is located by interacting with the web server after receiving the call from the customer and before transferring the call to the agent.

The illustrative embodiment uses session initiation protocol to enable the coordination of the speech signal of a call and screen image related to the call. It will be clear, however, to those skilled in the art, after reading this specification, how to make and use the present invention by using another protocol, such as H.323 internet protocol.

The illustrative embodiment of the present invention comprises: receiving at a data-processing system a first datum that describes a call, wherein the call originates at a first telecommunications terminal; and transferring the call from the data-processing system to a destination, wherein the transfer of the call comprises a second datum related to a user account; and wherein the second datum is based on the first datum.

DETAILED DESCRIPTION

Figure 1:
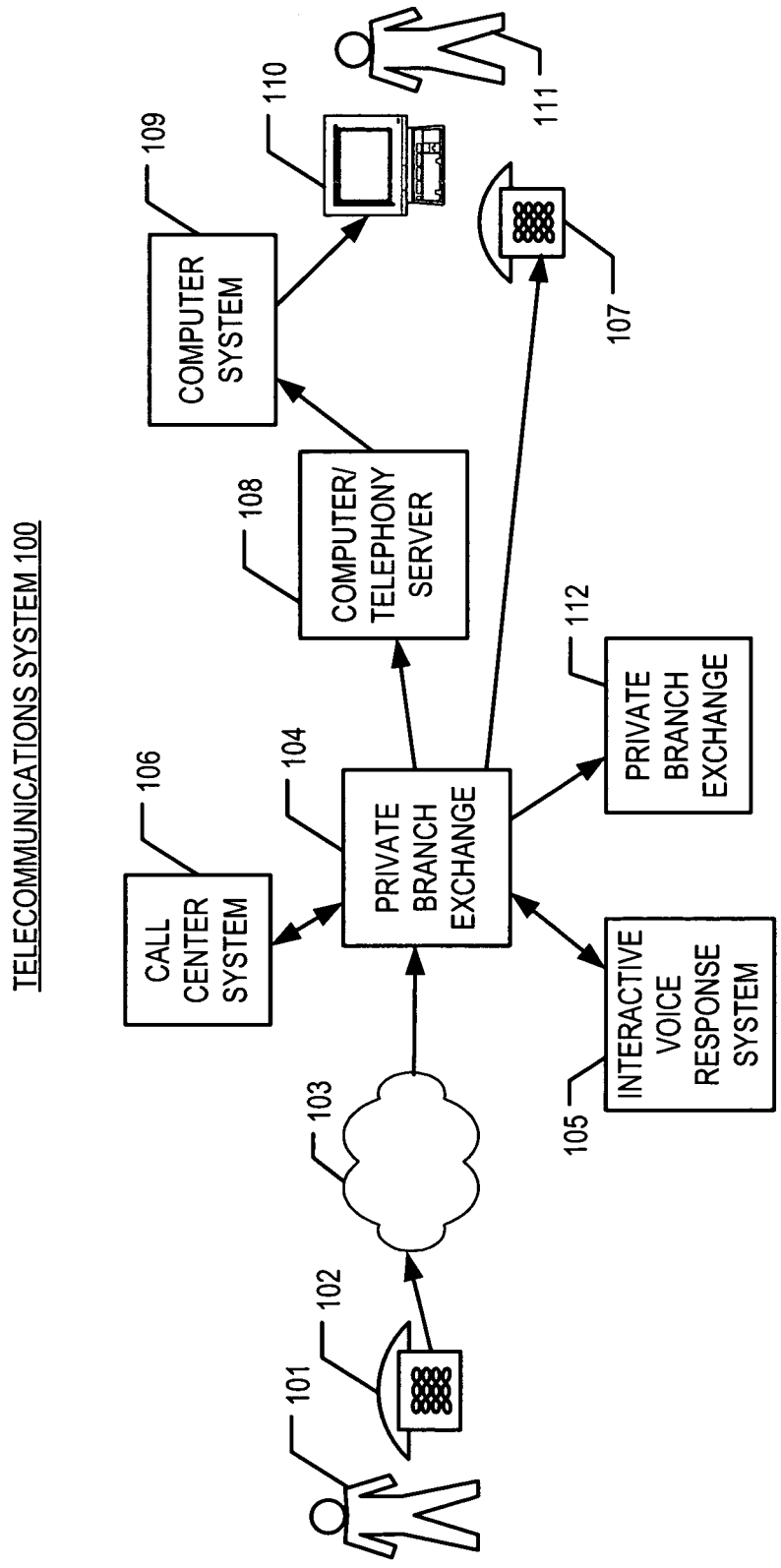
FIG. 1 depicts telecommunications system 100 in the prior art.
Figure 2:
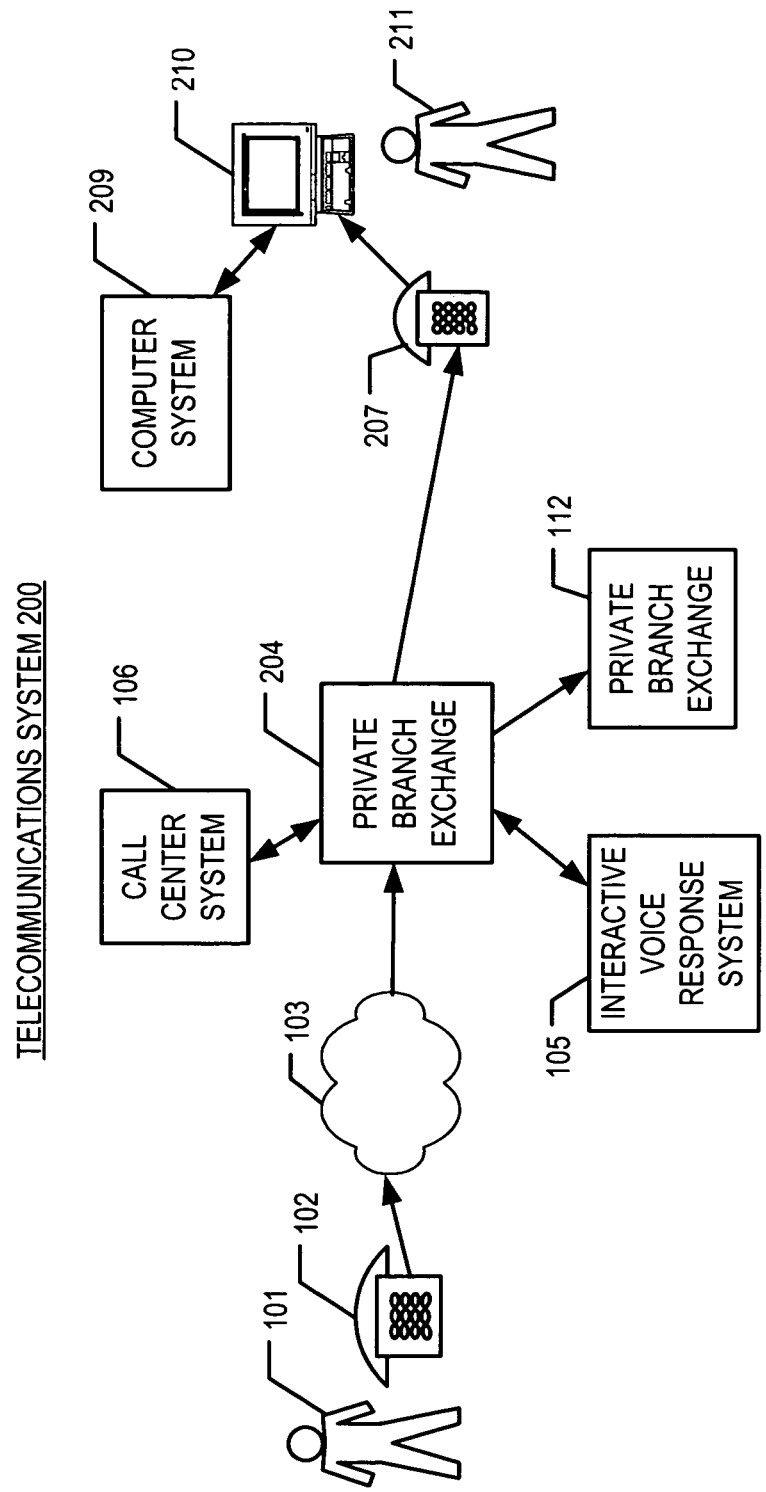
FIG. 2 depicts telecommunications system 200 in the prior art.
Figure 3:
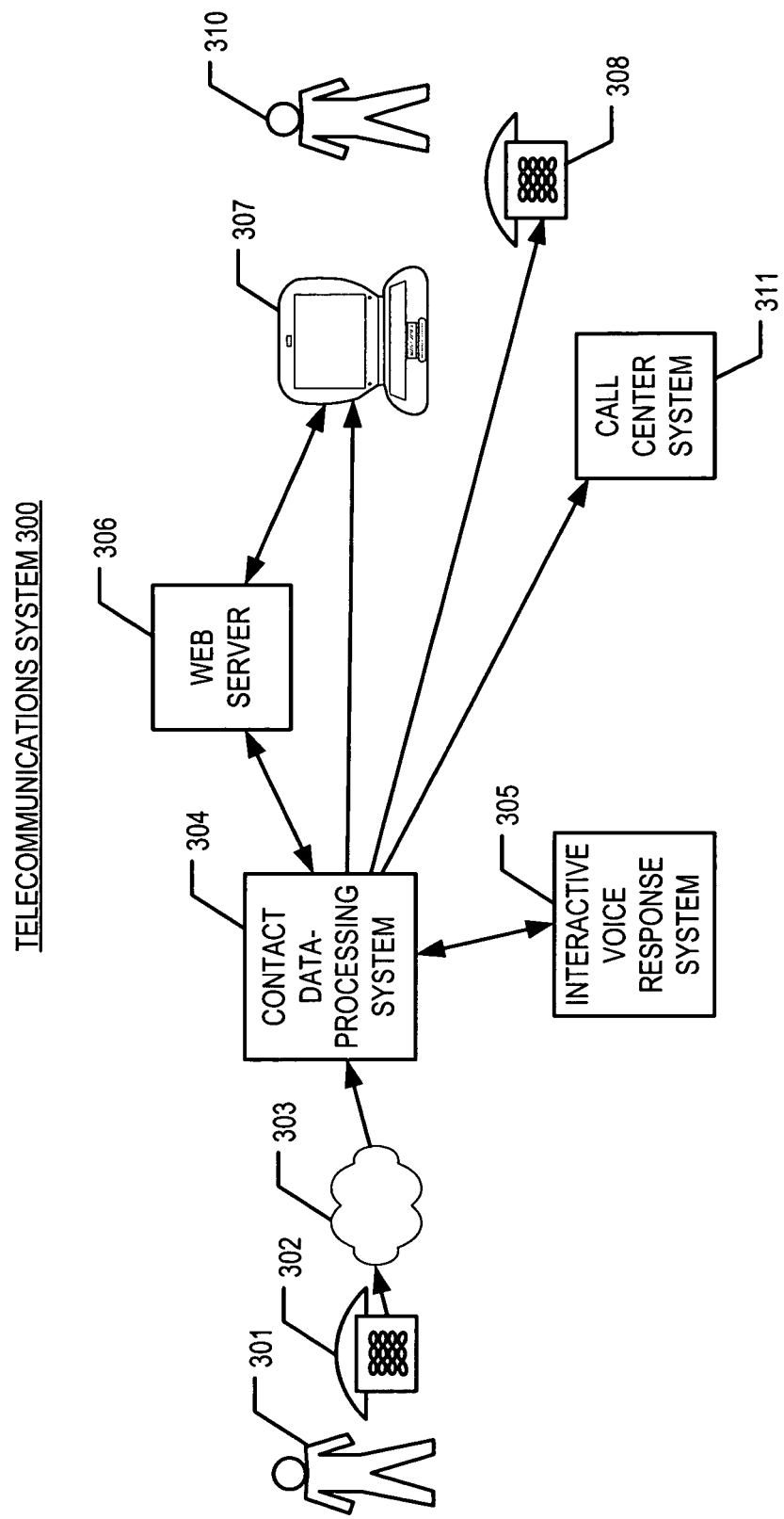
FIG. 3 depicts telecommunications system 300 in accordance with the illustrative embodiment of the present invention.

FIG. 3 depicts telecommunications system 300 in accordance with the illustrative embodiment of the present invention. Telecommunications system 300 comprises telecommunications terminal 302, telecommunications network 303, contact data-processing system 304, interactive voice response system 305, web server 306, telecommunications terminal 307, telecommunications terminal 308, and call center system 311, interconnected as shown.

User 301 of telecommunications terminal 302 is a user of a call center system or contact center system that is supported by contact data-processing system 304. For example, user 301 might be a customer or a supplier to a product or service provider that operates the contact center system. It will be appreciated by those skilled in the art, however, that telecommunications system 300 can be made and used with other types of calling users in mind.

Telecommunications terminal 302 is equivalent to telecommunications terminal 102. Terminal 302 serves user 301 in well-known fashion by enabling user 301 to originate a call to another user of telecommunications system 300. Terminal 302 transmits data that describes a call, speech signals, and input from user 301 (e.g., menu selections, etc.), in well-known fashion. It will be clear to those skilled in the art how to make and use telecommunications terminal 302.

Telecommunications network 303 provides the transport, switching, routing, and gateway functionality to connect terminal 302 with contact data-processing system 304, in well-known fashion, and to transmit signals from terminal 302. Network 303 generates data that describe a call that originates from terminal 302 and transmits that data to contact data-processing system 304 as part of the call. In some embodiments, network 303 comprises the Public Switched Telephone Network and a session initiation protocol (or "SIP") gateway, as are known in the art. It will be clear to those skilled in the art how to make and use telecommuncations network 303.

Contact data-processing system 304 serves one or more callers, such as user 301 via terminal 302, by transferring the calling party to another person, such as user 310 (an agent) via telecommunications terminal 307 or 308, or to a call center that comprises call center system 311. Contact data-processing system 304 is described in detail below and with respect to FIG. 4. Contact data-processing system 304 is capable of receiving an incoming call from terminal 302 via network 303, and receives speech signals that originate at terminal 302 and data that describe the call. Furthermore, contact data-processing system 304 transmits signals to and receives signals from interactive voice response system 305 and web server 306, in well-known fashion. Contact data-processing system 304 comprises automatic call distribution functionality, as is known in the art.

Contact data-processing system 304 interacts with one or more systems by using session initiation protocol (or "SIP"), as is known in the art, in accordance with the illustrative embodiment of the present invention. Contact data-processing system 304 uses SIP for the establishment, modification, and termination of telephony sessions (e.g., calls, etc.), for example, between telecommunications terminals 302 and 307. In some alternative embodiments, contact data-processing system 304 interacts with one or more systems by using another protocol, such as H.323 internet protocol, as is known in the art.

In accordance with the illustrative embodiment, contact data-processing system 304 constitutes a web server-based contact center, as is known in the art. In some alternative embodiments, contact data-processing system 304 might be part of a call center, which is also known in the art.

It will be clear to those skilled in the art, after reading this specification, how to make and use contact data-processing system 304.

Interactive voice response system 305 provides interactive voice response capability, in well-known fashion. Voice response system 305 receives via contact data-processing system 304 speech signals and other signals (e.g., dual tone multi-frequency, etc.) that indicate selections. Voice response system 305 transmits data back to contact data-processing system 304 in response to and based on the received selections, in accordance with the illustrative embodiment of the present invention. In some alternative embodiments, voice response system 305 exchanges data with one or more web servers, in well-known fashion. It will be clear to those skilled in the art how to make and use interactive voice response system 305.

Web server 306 is a business applications web server that provides access to a customer relationship management (or "CRM") database, as is known in the art. Web server 306 receives signals from contact data-processing system 304 that are used to query web server 306 for data related to a user, such as user 301. Web server 306 transmits the data related to a user back to contact data-processing system 304. Web server also exchanges signals with telecommunications terminal 307, in accordance with the illustrative embodiment. It will be clear to those skilled in the art how to make and use web server 306.

Telecommunications terminal 307 is an internet protocol softphone, as is known in the art and in accordance with the illustrative embodiment of the present invention. As a softphone, terminal 307 runs on a personal computer in well-known fashion. Telecommunications terminal 307 is described in detail below and with respect to FIG. 5, and is associated with user 310, an agent that receives calls. SIP-enabled terminal 307 serves user 310 by enabling the user to receive a call from user 301 that has been transferred by contact data-processing system 304. Terminal 307 also serves user 310 by enabling communication with user 301 as part of the call. Terminal 307 receives data that is related to a user (e.g., a customer, etc.) and signals (e.g., speech, etc.) from user 301. Also, terminal 307 exchanges signals with web server 306, in accordance with the illustrative embodiment of the present invention.

There are other possible configurations for terminal 307 than that of a standalone, internet protocol softphone. In some alternative embodiments, terminal 307 might be an internet protocol softphone with an associated time division multiplex (or "TDM") phone, as depicted by telecommunications terminal 308. Telecommunications terminal 308 is able to receive speech signals from terminal 302 in time division-multiplexed format, as is known in the art, as directed via contact data-processing system 304. Telecommunications terminal 308 can be associated with user 310 or can be associated with another agent. It will be clear to those skilled in the art how to make and use telecommunications terminal 308.

Furthermore, in other alternative embodiments, terminal 307 might be an internet protocol hardphone, as is known in the art, with a built-in browser. In still other alternative embodiments, terminal 307 might be an internet protocol softphone that runs on a device other than a personal computer, such as a personal digital assistant (or "PDA"). As will be appreciated by those skilled in the art, there are other possible configurations of terminal 307 than those already mentioned.

It will be clear to those skilled in the art, after reading this specification, how to make and use telecommunications terminal 307.

Call center system 311 constitutes a call center, as is known in the art. Call center system 311 comprises a computer system for information entry and lookup (e.g., for customer orders, etc.), an automatic call distributor function, and a plurality of telecommunications terminals associated with users (e.g., agents, etc.) who receive calls. Call center system 311 receives transferred calls, as well as data related to a user or users. It will be clear to those skilled in the art how to make and use call center system 311.

As will be further appreciated by those skilled in the art, in some embodiments two or more telecommunications terminals in telecommunications system 300 might be connected during a call via data-processing systems and networks, in addition to data-processing system 304 and telecommunications network 303. It will be clear to those skilled in the art how to make and use telecommunications system 300 with additional data-processing systems and telecommunications networks present than depicted in FIG. 3.

Figure 4:
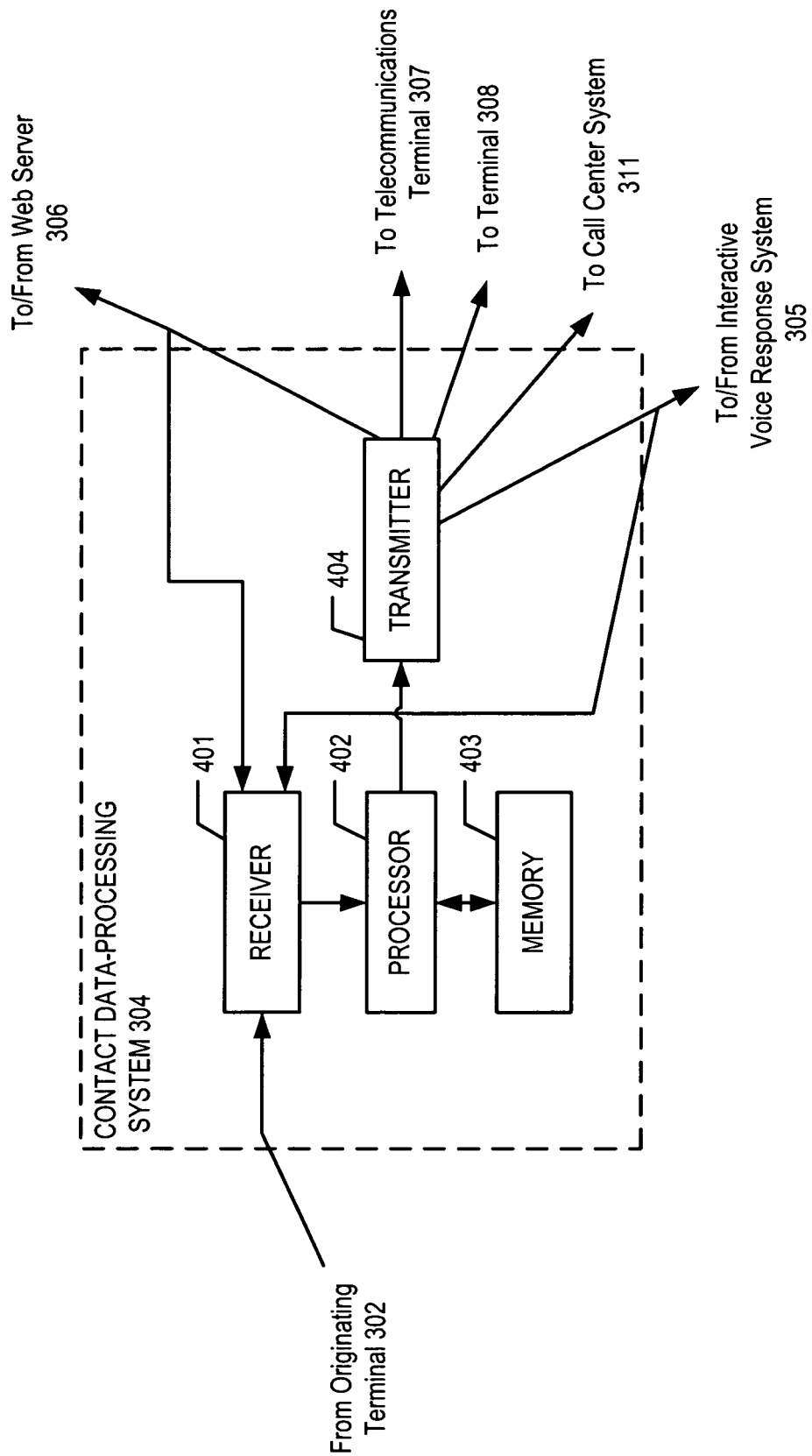
FIG. 4 depicts a block diagram of data-processing system 304, as shown in FIG. 3, in accordance with the illustrative embodiment of the present invention.

FIG. 4 depicts a block diagram of the salient components of data-processing system 304, in accordance with the illustrative embodiment of the present invention. Data-processing system 304 comprises receiver 401, processor 402, memory 403, and transmitter 404, interconnected as shown.

Receiver 401 receives: (i) speech and data signals from originating terminal 302 via telecommunications network 303, (ii) data signals from interactive voice response system 305, and (iii) data signals from web server 306. Receiver 401 forwards the information encoded in the signals to processor 402. It will be clear to those skilled in the art, after reading this specification, how to make and use receiver 401.

Processor 402 is a general-purpose processor that is capable of receiving information from receiver 401, of executing instructions stored in memory 403, of reading data from and writing data into memory 403, of executing the tasks described below and with respect to FIGS. 6, 7, and 8, and of transmitting information to transmitter 404. In some alternative embodiments of the present invention, processor 402 might be a special-purpose processor. In either case, it will be clear to those skilled in the art, after reading this specification, how to make and use processor 402.

Memory 403 stores data and executable instructions, as is well-known in the art, and might be any combination of random-access memory (RAM), flash memory, disk drive memory, etc. It will be clear to those skilled in the art, after reading this specification, how to make and use memory 403.

Transmitter 404 receives information from processor 402 and transmits signals that encode this information to interactive voice response system 305, web server 306, telecommunications terminals 307 and 308, and call center system 311, in well-known fashion. It will be clear to those skilled in the art, after reading this specification, how to make and use transmitter 404.

Figure 5:
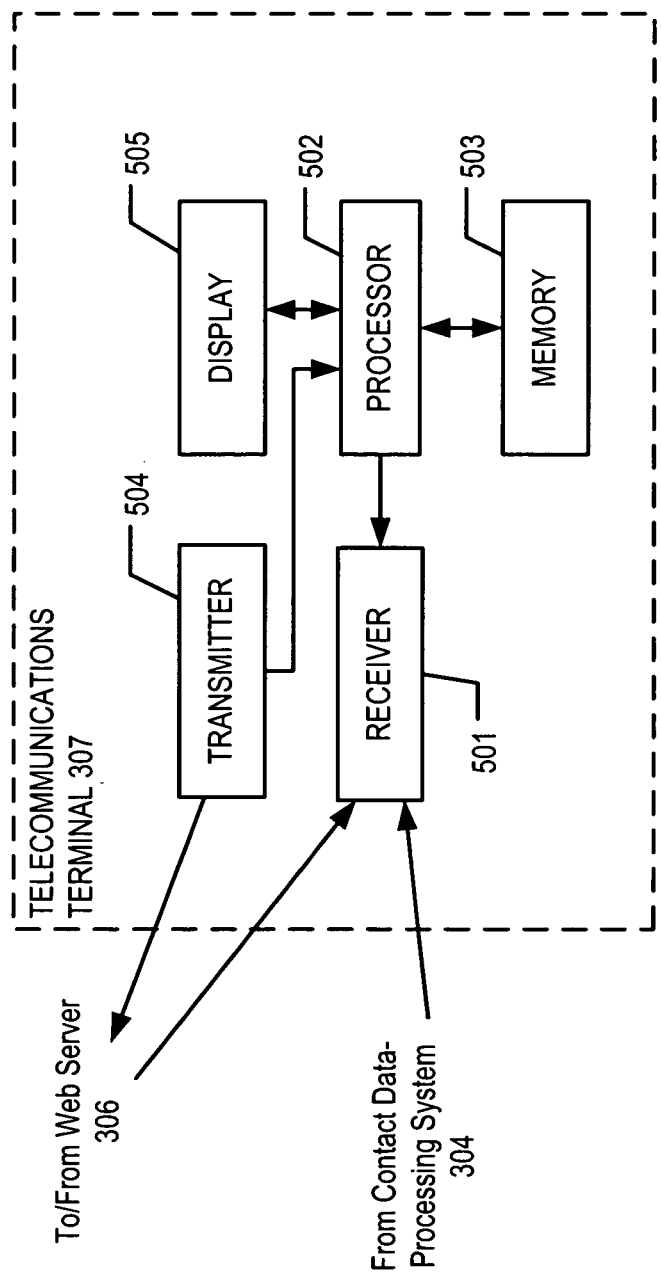
FIG. 5 depicts a block diagram of telecommunications terminal 307, as shown in FIG. 3, in accordance with the illustrative embodiment of the present invention.

FIG. 5 depicts a block diagram of the salient components of telecommunications terminal 307, in accordance with the illustrative embodiment of the present invention. Terminal 307 comprises receiver 501, processor 502, memory 503, transmitter 504, and display 505, interconnected as shown.

Receiver 501 receives: (i) speech and data signals from contact data-processing system 304, and (ii) data signals from web server 306. Receiver 501 forwards the information encoded in the signals to processor 502. It will be clear to those skilled in the art, after reading this specification, how to make and use receiver 501.

Processor 502 is a general-purpose processor that is capable of receiving information from receiver 501, of executing instructions stored in memory 503, of reading data from and writing data into memory 503, of executing the tasks described below and with respect to FIGS. 6 and 9, and of transmitting information to transmitter 504. In some alternative embodiments of the present invention, processor 502 might be a special-purpose processor. In either case, it will be clear to those skilled in the art, after reading this specification, how to make and use processor 502.

Memory 503 stores data and executable instructions, as is well-known in the art, and might be any combination of random-access memory (RAM), flash memory, disk drive memory, etc. It will be clear to those skilled in the art, after reading this specification, how to make and use memory 503.

Transmitter 504 receives information from processor 502 and transmits signals that encode this information to web server 306, in well-known fashion. It will be clear to those skilled in the art, after reading this specification, how to make and use transmitter 504.

Display 505 displays information from processor 502 in well-known fashion. The displayed information includes data related to a user from data-processing system 304 or web server 306, or both. It will be clear to those skilled in the art, after reading this specification, how to make and use display 505.

Figure 6:
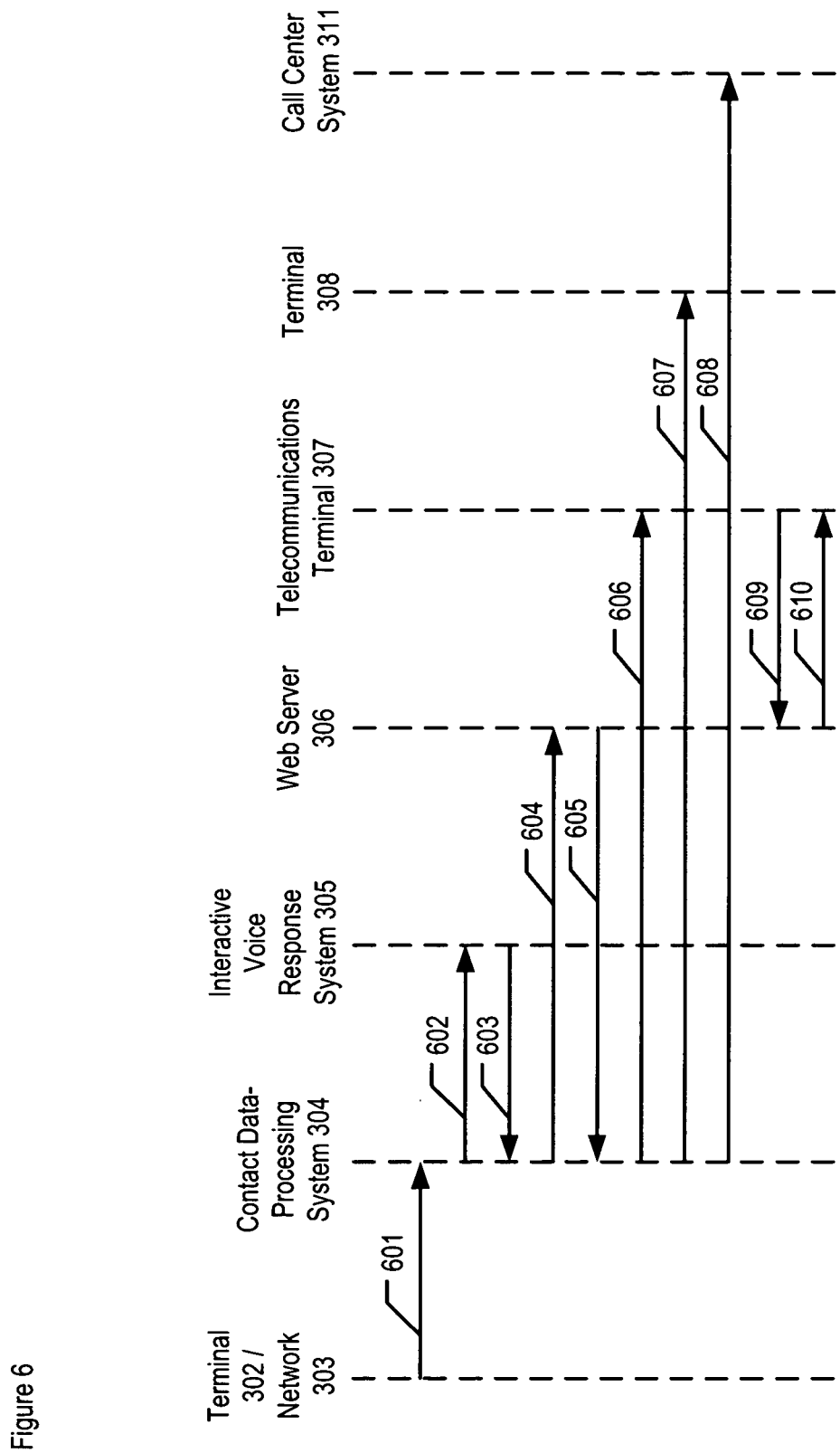
FIG. 6 depicts a message flow diagram of telecommunications system 300, in accordance with the illustrative embodiment of the present invention.

FIG. 6 depicts a message flow diagram of telecommunications system 300, in accordance with the illustrative embodiment of the present invention. The message flow of FIG. 6 represents an illustrative call transfer scenario, in which a customer Jane Doe, depicted as user 301, needs help with a computer product she purchased from the fictitious XYZ Company and calls XYZ's technical support number by using terminal 302. In accordance with the illustrative embodiment, some or all of the messages depicted in FIG. 6 are transmitted via an internet protocol-based network using session initiation protocol (SIP), as is known in the art. As will be appreciated by those skilled in the art, in some alternative embodiments the messages might be transmitted via another combination of network(s) and protocol(s).

In accordance with the illustrative embodiment of the present invention, the payloads of the messages can be packaged as extra "body" components that are transmitted via a segment of a multipart MIME, or "multipurpose internet mail extension," as is known in the art, in which a "type" is defined for the segment. The payloads are formatted as XML, or "extensible markup language," as is known in the art. In some embodiments, the segments are encrypted. When the receiver of a message is a voice XML (VXML) interpreter, such as in interactive voice response system 305, the XML payload is parsed and assigned to an ECMAscript object, as is known in the art, which can be accessed by the VXML session variables. When a VXML script wants to send an XML payload with a transfer, it constructs a uniform resource location (URL) argument of ?body=<object>, where <object> is an ECMAscript variable. The ECMAscript object is formatted into an XML structure and placed into a segment of a multipart MIME message.

Terminal 302 originates a call made by Jane Doe to XYZ's technical support contact center, supported by contact data-processing system 304. Terminal 302, in conjunction with network 303, transmits signals, including Jane's speech signals, to data-processing system 304 in well-known fashion, as represented by event 601. The transmitted signals convey data that describe the call. The data can include a calling party identifier, the called party identifier, information about terminal 302's terminal type, and user-to-user information (such as if the call is passing through an upstream calling center via network 303), as are all known in the art. Some of the data can come from terminal 302, and some of the data can come from network 303. As will be appreciated by those skilled in the art, the data that describes the call can comprise other information than that already described.

Contact data-processing system 304 receives the data and speech signals from terminal 302 and network 303. Based on the received data and possibly other criteria, data-processing system 304 interacts with interactive voice response system 305 at event 602. Event 602 represents inputs specified by Jane Doe as part of (i) Jane's received speech signals or (ii) Jane's non-verbal commands, such as keypad entries that are received by system 305 as dual tone multi-frequency signaling, or (iii) a combination of the two.

Interactive voice response system 305 receives the user-specified inputs and transmits data based on those inputs to data-processing system 304 via message 603. For example, Jane might have indicated that she has a computer problem, as opposed to a printer or other peripheral problem, and her indication(s) are represented by the data in message 603.

Data-processing system 304 transmits message 604 to business applications web server 306. Message 604 comprises (i) the data that describe the call from Jane Doe and (ii) the data from interactive voice response system 305.

Web server 306 receives message 604. Based on the received data, web server 306 generates data related to a user (i.e., Jane Doe), for example by retrieving the data from a customer relationship management database. There are two types of data related to a user: (i) actual user account data, and (ii) a pointer to where the user account data can be accessed.

If web server 306 passes the actual user account data, the user account data might comprise: (i) the user account number (at a minimum), (ii) information based on the interactive voice response selections made earlier, (iii) the amount of time that the caller had to wait for an available agent, etc. As will be appreciated by those skilled in the art, the user account data can comprise other information related to Jane Doe (or to the person for whom Jane Doe is calling, if her computer is in someone else's name) that user 310, as the agent who has been selected to help the caller, might need to know.

A scenario in which the actual user account data might be passed is when it is expedient to pass all of the information that the agent at terminal 307 might need to know when helping Jane Doe, including the user account number. This makes sense when the particular agent can be entrusted with confidential information (e.g., customer credit card numbers, case history, date of birth, etc.). In this scenario, terminal 307 would not necessarily have to access web server 306 to display the screen pop of the user account data because the data transmitted in message 605 might sufficiently represent displayable information.

If web server 306 passes a pointer to where the user account data can be accessed, the pointer is an address of a computer file or database in web server 306. This address, for example, might be a Uniform Resource Locator (or "URL") address that points to a web page that web server 306 dynamically creates for storing the user account data of Jane Doe, if only temporarily. Terminal 307 can then access the user account data from web server 306 later.

A scenario in which the pointer to the user account data might be passed is when the agent at terminal 307 has limited permission to access user account data. When terminal 307 receives the pointer and uses it to access user account data, web server 306 provides only the user account data in the screen pop that the particular agent needs to see (and is authorized to see).

Web server 306 transmits message 605 that comprises the data related to the user.

Contact data-processing system 304 receives message 605 and examines the data related to the user. Based on the data and other criteria (e.g., call agent skills, etc.), data-processing system 304 selects a call agent to handle Jane Doe's problem, depicted by user 310, at associated terminal 307. Data-processing system 304 transfers the call to user 310 in well-known fashion at event 606.

Event 606 represents the transfer of the call in the illustrative scenario. The transfer of the call comprises: (i) the data related to the user (i.e., Jane Doe), and (ii) a directing of the signal (e.g., speech, etc.) path from Jane Doe to terminal 307. Of particular significance here is that the context of the call (i.e., the data related to the user) is embedded in the transferred call itself, rather than being pushed to an agent's computer screen separately from the call to the agent's phone.

In some alternative embodiments, contact data-processing system 304 can also direct the speech signals from terminal 302 to terminal 308, as shown by event 607.

In some other alternative embodiments, contact data-processing system 304 can transfer the call to call center system 311, as shown by event 608. For example, Jane Doe's computer problem might be of a certain type that is handled by an outsourced call center.

Telecommunications terminal 307 receives the transferred call, represented by event 606, including the data related to the user. If the data related to the user is the actual user account data, terminal 307 can either (i) display the user account data without having to access web server 306 or (ii) transmit to web server 306 some information derived from the user account data (e.g., account number, etc.) as part of message 609. Alternatively, if the data related to the user is a pointer to the user account data, terminal 307 transmits that pointer to web server 306 as part of message 609.

Terminal 307 extracts the data related to the user and uses scripting, in well-known fashion, to enable the data to be used for display. The script can recognize a uniform resource location (URL) address or derives a URL address from the received data.

Web server 306 receives message 609 that comprises a pointer to the user account data. Based on the pointer, web server 306 transmits to telecommunications terminal 307 the computer file in message 610. The computer file can comprise, for example, a representation of a screen image that a browser in telecommunications terminal 307 can display on display 505 as a screen pop. In the example, Jane Doe's information is displayed in the screen pop.

Figure 7:
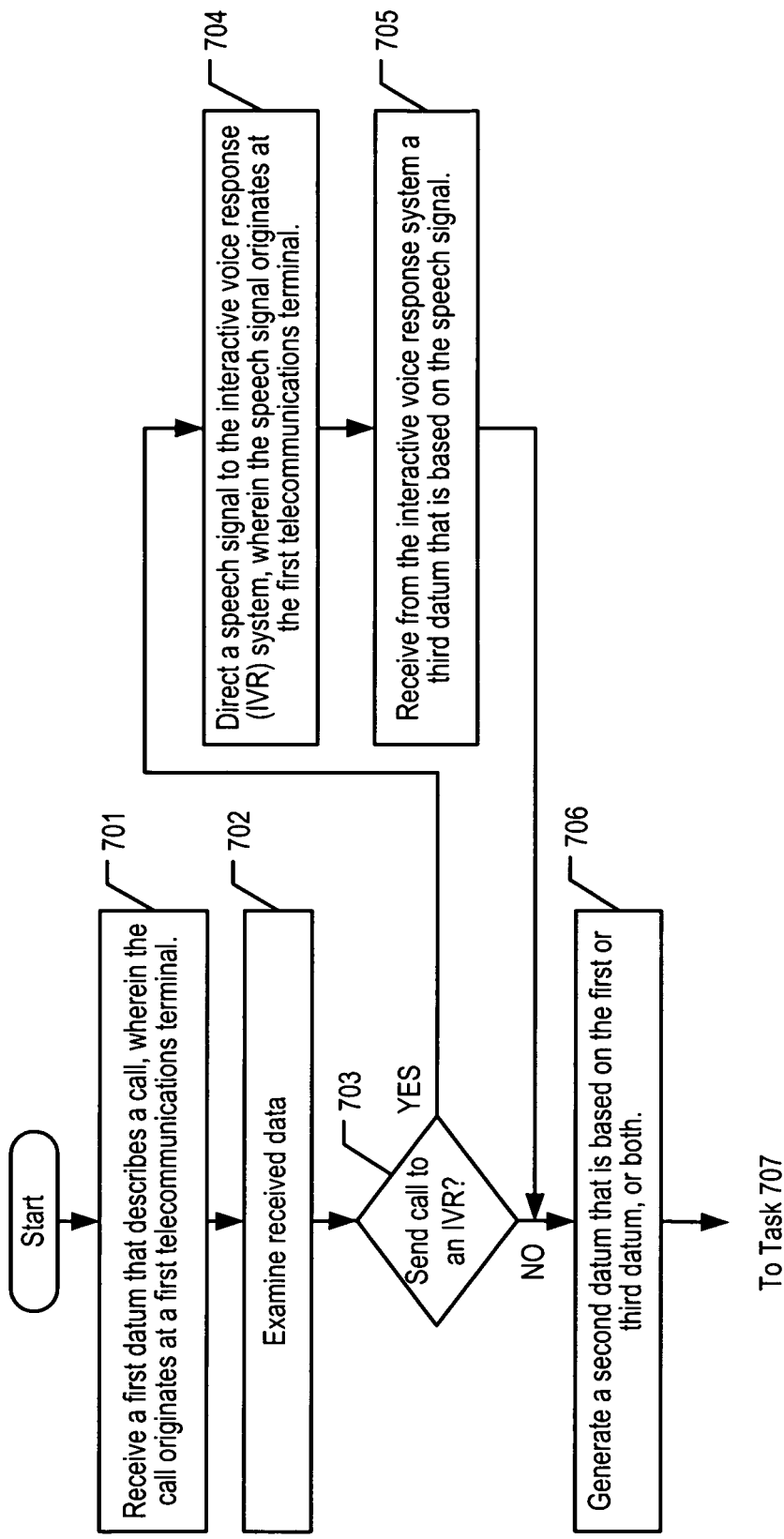
FIG. 7 depicts a first flowchart of the salient tasks of data-processing system 304, in accordance with the illustrative embodiment of the present invention.
Figure 8:
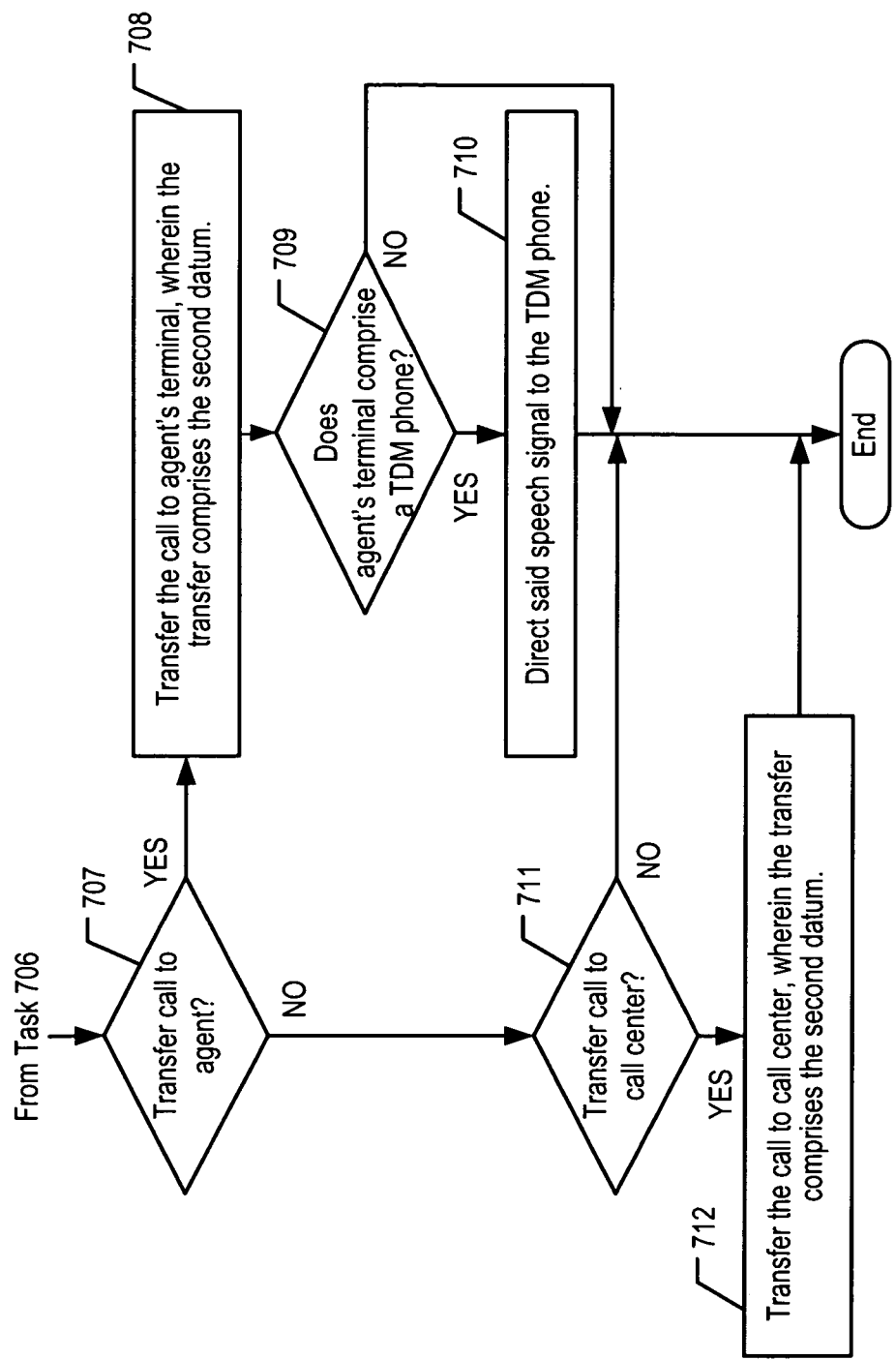
FIG. 8 depicts a second flowchart of the salient tasks of data-processing system 304, in accordance with the illustrative embodiment of the present invention.

FIGS. 7 and 8 depict a flowchart of the salient tasks performed by contact data-processing system 304 in receiving and transferring a call to a user, such as a call agent, or to a call center system, in accordance with the illustrative embodiment of the present invention. The description that follows draws from the same call-transfer example used with respect to FIG. 6. It will be clear to those skilled in the art which tasks depicted in FIGS. 7 and 8 can be performed simultaneously or in a different order than that depicted.

The example provided is for a single originating call. It will be clear, however, to those skilled in the art and after reading this specification, how to perform call transfer for multiple calls concurrently.

At task 701, depicted in FIG. 7, data-processing system 304 receives, in well-known fashion, a message that comprises at least a first datum. Data-processing system 304 receives the message via network 303. The first datum describes the call, which originates at terminal 302. For example, the first datum might represent a calling number that corresponds to terminal 302. The first datum is used at task 706 to determine a second datum, which is described with respect to that task.

At task 702, data-processing system 304 examines the datum or data received. One or more applications use the received data for the purpose of making a routing decision. As those who are skilled in the art will appreciate, the routing decision might require invoking applications other than the ones described below and with respect to FIG. 7.

At task 703, data-processing system 304 determines in well-known fashion if an interactive voice response application is to be invoked for the call. If not, task execution proceeds to task 706.

At task 704, data-processing system 304 directs a speech signal to interactive voice response system 305, in well-known fashion. The speech signal originates at terminal 302 and comprises user inputs. In some alternative embodiments, data-processing system 304 directs non-verbal user indications (e.g., keypad selections, etc.) to interactive voice response system 305.

At task 705, data-processing system 304 receives from interactive voice response system 305 at least a third datum that is based on the user inputs (i.e., in the speech signal or non-verbal indications) transmitted to system 305.

At task 706, in accordance with the illustrative embodiment data-processing system 304 generates at least the second datum mentioned at task 701. The second datum is related to a user and based on the first datum. The second datum is also based on the third datum, in some embodiments. To generate the second datum, data-processing system 304 exchanges information with web server 306, as described earlier and with respect to FIG. 6.

Starting at task 707, depicted in FIG. 8, data-processing system 304 selects a destination, such as a telecommunications terminal or call center, to which to transfer the call. The selection is performed via an automated call distribution (or "ACD") function, as is known in the art. In some alternative embodiments, the automated call distribution function is implemented in a device that is separate from data-processing system 304. In some embodiments, the selection is based on the call agent or attributes of the call agent, such as the skill set of the agent. In some other embodiments, the selection is based on the user of telecommunications terminal 302. As will be appreciated by those skilled in the art, the selection can consider other criteria (e.g., next available agent, etc.).

If the call is to be transferred to the agent's terminal, task execution proceeds to task 708. If not, task execution proceeds to task 711.

At task 708, data-processing system 304 transfers the call to the agent's terminal, in accordance with the illustrative embodiment of the present invention. Data-processing system 304 has selected as the destination telecommunications terminal 307 that is associated with a call agent, depicted by user 310. The transfer comprises the second datum, as well as other supplied data.

As will be appreciated by those who are skilled in the art, after the call has been transferred to the agent, the agent might interact with the caller, add additional data, and transfer the call back to contact data-processing system 304 for a subsequent routing decision (e.g., to another agent, to another call center, etc.) that is based on the additional data, until the call is considered to be complete.

At task 709, data-processing system 304 determines if the agent receiving the call has a TDM-based terminal, depicted as terminal 308. If not, task execution ends.

At task 710, data-processing system 304 optionally directs the speech signal from originating terminal 302 to terminal 308. After task 710, task execution ends.

At task 711, if the call is to be transferred to a different call center, task execution proceeds to task 712. If not, task execution ends.

At task 712, data-processing system 304 transfers the call to the call center, in accordance with the illustrative embodiment of the present invention. Data-processing system 304 has selected as the destination call center system 311. The transfer comprises the second datum, as well as other supplied data. After task 712, task execution ends.

Figure 9:
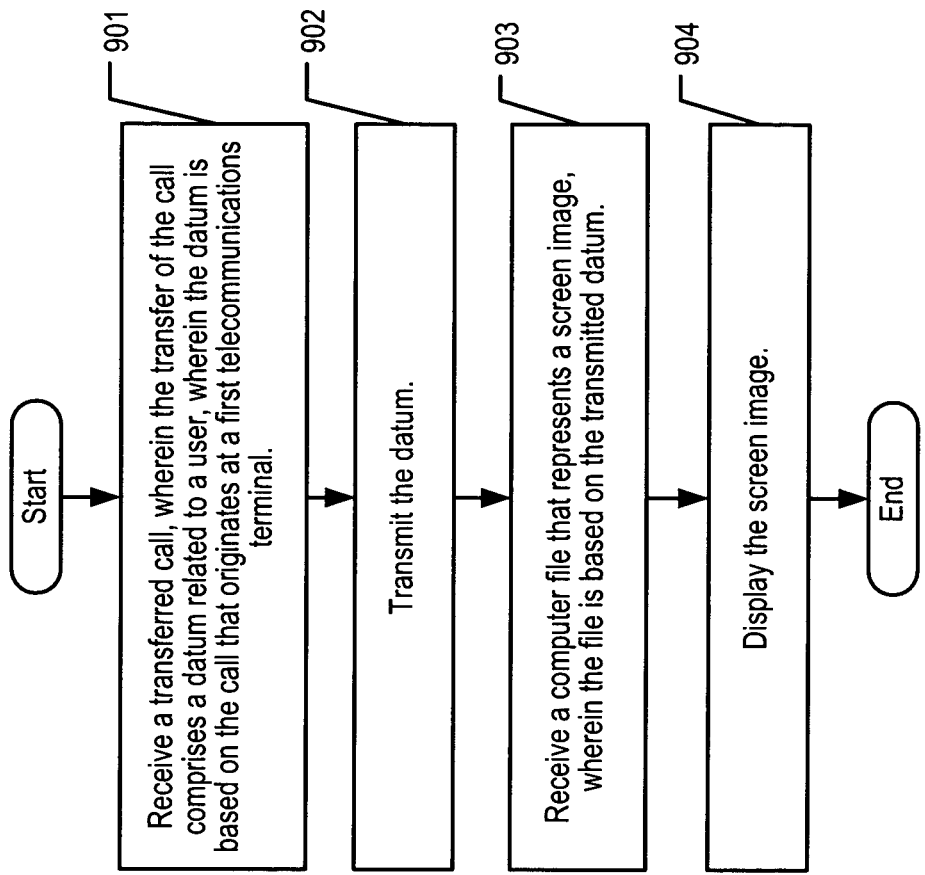
FIG. 9 depicts a flowchart of the salient tasks of telecommunications terminal 307, in accordance with the illustrative embodiment of the present invention.

FIG. 9 depicts a flowchart of the salient tasks performed by telecommunications terminal 307 in receiving and processing a transferred call from contact data-processing system 304, in accordance with the illustrative embodiment of the present invention. The description that follows draws from the same call-transfer example used with respect to FIG. 6. It will be clear to those skilled in the art which tasks depicted in FIG. 9 can be performed simultaneously or in a different order than that depicted.

The example provided is for a single transferred call. It will be clear, however, to those skilled in the art and after reading this specification, how to process multiple transferred calls concurrently.

At task 901, terminal 307 receives a transferred call, originated at terminal 302, in which the transfer of the call comprises a datum that is related to a user (i.e., user 301 of terminal 302). The datum is based on the call. As described earlier and with respect to FIG. 6, the datum can represent actual user account data or it can represent a pointer (e.g., an address to a computer file, etc.) to the account data.

At task 902, terminal 307 transmits to web server 306 either (i) the datum, if the datum represents a pointer, or (ii) a pointer derived from the received datum.

At task 903, terminal 307 receives a computer file the represents a screen image. The file is based on the transmitted datum.

At task 904, terminal 307 displays on display 505 the screen image represented by the received computer file, thereby achieving the screen pop. After task 904, task execution ends.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
    receiving, by a data-processing system that is associated with a call center system,
        i) a voice call from a calling party, and
        ii) a first datum that identifies the calling party;
    generating by the data-processing system, in response to receiving the voice call and the first datum, a pointer to where account data about the calling party can be accessed by a destination in the call center system, wherein the pointer is based on the first datum;
    embedding by the data-processing system, a second datum within a Session Initiation Protocol message, the second datum comprising the pointer; and
    transferring by the data-processing system, the voice call from the data-processing system to the destination in the call center system, wherein the transferring of the voice call comprises transmitting the Session Initiation Protocol message to the destination, and wherein the pointer to where account data about the calling party can be accessed is embedded in the call transfer thereby enabling both the transferred voice call and the pointer to be received concurrently at the destination in the call center system.

2. The method of claim 1 wherein the embedding of the pointer in the Session Initiation Protocol message is based on an access permission of an agent at the destination in the call center system.

3. The method of claim 1 wherein the second datum represents an address of a computer file.

4. The method of claim 3 wherein the address of the computer file is a Uniform Resource Locator address.

5. The method of claim 1 further comprising:
    directing a speech signal to an interactive voice response system that is also associated with the call center system, wherein the speech signal is that of the calling party; and
    receiving by the data-processing system from the interactive voice response system a third datum that is based on the speech signal;
    wherein the second datum is also based on the third datum.

6. The method of claim 5 further comprising selecting the destination to which to transfer the voice call, wherein the destination selected is based on the third datum.

7. The method of claim 6 wherein the destination selected is also based on the calling party.

8. The method of claim 1 further comprising:
    transmitting an identifier of the calling party to a server, based on receiving the first datum; and
    receiving information from the server as to where account data about the calling party can be accessed, based on the transmitting of the identifier.

9. A telecommunications system comprising:
    a call center system; and
    a data-processing system that is associated with the call center system, the data-processing system being adapted for:
        (A) receiving (i) a voice call from a calling party, and (ii) a first datum that identifies the calling party, and
        (B) generating, in response to receiving the voice call and the first datum, a pointer to where account data about the calling party can be accessed by a destination in the call center system, wherein the pointer is based on the first datum, and
        (C) embedding a second datum within a Session Initiation Protocol message, the second datum comprising the pointer, and
        (D) transferring the voice call from the data-processing system to the destination in the call center system, wherein the transferring of the voice call comprises transmitting the Session Initiation Protocol message to the destination, and wherein the pointer to where account data about the calling party can be accessed is embedded in the call transfer thereby enabling both the transferred voice call and the pointer to be received concurrently at the destination in the call center system.

10. The telecommunications system of claim 9 wherein the embedding of the pointer in the Session Initiation Protocol message is based on an access permission of an agent at the destination in the call center system.

11. The telecommunications system of claim 9 wherein the second datum represents an address of a computer file.

12. The telecommunications system of claim 11 wherein the address of the computer file is a Uniform Resource Locator address.

13. The telecommunications system of claim 9 further comprising:
    an interactive voice response system that is also associated with the call center system; and
    further wherein the data-processing system is further adapted for:
        directing a speech signal to the interactive voice response system, wherein the speech signal is that of the calling party, and
        receiving by the data-processing system from the interactive voice response system a third datum that is based on the speech signal, and
        wherein the second datum is also based on the third datum.

14. The telecommunications system of claim 13 further comprising selecting the destination to which to transfer the voice call, wherein the destination selected is based on the third datum.

15. The telecommunications system of claim 14 wherein the destination selected is also based on the calling party.

16. The telecommunications system of claim 9 further comprising:
    a web server that is associated with the data-processing system; and
    further wherein the data-processing system is further adapted for:
        transmitting an identifier of the calling party to the web server, based on receiving the first datum; and
        receiving information from the web server as to where account data about the calling party can be accessed.

* * * * *